US009299119B2

(12) United States Patent  (10) Patent No.: US 9,299,119 B2
Gefen et al.  (45) Date of Patent: Mar. 29, 2016

(54) OVERLAY-BASED WATERMARKING FOR VIDEO SYNCHRONIZATION WITH CONTEXTUAL DATA

(71) Applicant: Disney Enterprises, Inc., Burbank, CA (US)

(72) Inventors: Smadar Gefen, Burbank, CA (US); Joseph DiGiovanni, Burbank, CA (US)

(73) Assignee: DISNEY ENTERPRISES, INC., Burbank, CA (US)

( * ) Notice: Subject to any disclaimer, the term of this patent is extended or adjusted under 35 U.S.C. 154(b) by 0 days.

(21) Appl. No.: 14/188,103

(22) Filed: Feb. 24, 2014

(65) Prior Publication Data

US 2015/0242983 A1   Aug. 27, 2015

(51) Int. Cl.
*G06K 9/00* (2006.01)
*G06T 1/00* (2006.01)
*G09G 5/377* (2006.01)

(52) U.S. Cl.
CPC .............. *G06T 1/0021* (2013.01); *G09G 5/377* (2013.01)

(58) Field of Classification Search
CPC .................................................... G09G 5/377
USPC ........................................................ 382/100
See application file for complete search history.

(56) References Cited

U.S. PATENT DOCUMENTS

| 2003/0043172 A1* | 3/2003 | Li et al. ........................ 345/636 |
| 2010/0150394 A1* | 6/2010 | Bloom .................. G06T 1/0035 382/100 |
| 2013/0321570 A1* | 12/2013 | Ferren .................. G06K 9/3266 348/42 |
| 2014/0044258 A1* | 2/2014 | Grewal ................ H04N 21/266 380/200 |

* cited by examiner

*Primary Examiner* — Gregory F Cunningham
(74) *Attorney, Agent, or Firm* — Fay Kaplun & Marcin, LLP (57) ABSTRACT

Systems and methods for synchronizing a broadcast video with contextual data are disclosed, wherein the broadcast video is enhanced by graphical overlays. Synchronization is achieved by means of digital watermarking of the broadcast video in conjunction with the graphical-overlays. Exemplary embodiments embed a watermark bitstream into the broadcast video based on an overlay-template, characteristic of a corresponding overlay-graphic. The watermarked video is then transmitted over a communication link to a receiving-end including a detector. According to some embodiment, the embedder inserts the watermark bitstream into the overlay-graphics' regions of the video and the detector extracts the watermark bitstream based on information in the overlay-template and based on a restored version of the original overlay-graphics.

26 Claims, 4 Drawing Sheets

Figure 1

(Prior Art)

Figure 2

(Prior Art)

OVERLAY-BASED WATERMARKING FOR VIDEO SYNCHRONIZATION WITH CONTEXTUAL DATA

FIELD OF INVENTION

Embodiments of the present invention relate to digital watermarking of broadcast video in conjunction with graphical overlays.

BACKGROUND OF INVENTION

Graphical overlays are common additions to modern television production. Live broadcast, covering news or sporting events for instance, is often augmented by graphical overlays, referred to here as enhancements. When covering a sporting event, game enhancements may contain information related to the action, background data, or statistics. For example, the game-clock and game-scores usually appear in the dash-board graphics. Other graphical representations may contain information regarding the players' or the teams' current (or past) performance. Using overlays to complement audio commentary as well as to provide further insight into the game is an integral part of today's live production and is also an important outlet for delivering event related analytics, promoting upcoming programming and the broadcast company brand, and presenting sponsorships.

As the infrastructure for delivering broadband multimedia content to consumers becomes more feasible and efficient, production of content captured by ultra-high-definition (UHD) or high-dynamic-range (HDR) cameras will be increasing. Displays that serve UHD/HDR content are becoming more affordable and new codecs such as HEVC (H.265) and VP9 already enable the streaming of 4K video. Moreover, high-rate cameras are used nowadays for slow motion play-backs and are likely to replace standard cameras in future high-scale sports productions. This advanced capturing technology may produce oversampling in the spatial, tone, or temporal domains. Though, this oversampling is intentional and designed to improve visualization of the action, it is redundant in areas of the video image that are relatively static or with low detail or contrast. Especially, high sampling of video regions where enhancements are rendered may not have any added value. This possible redundancy in overlays' representation may be used to embed additional data.

Figure 1:
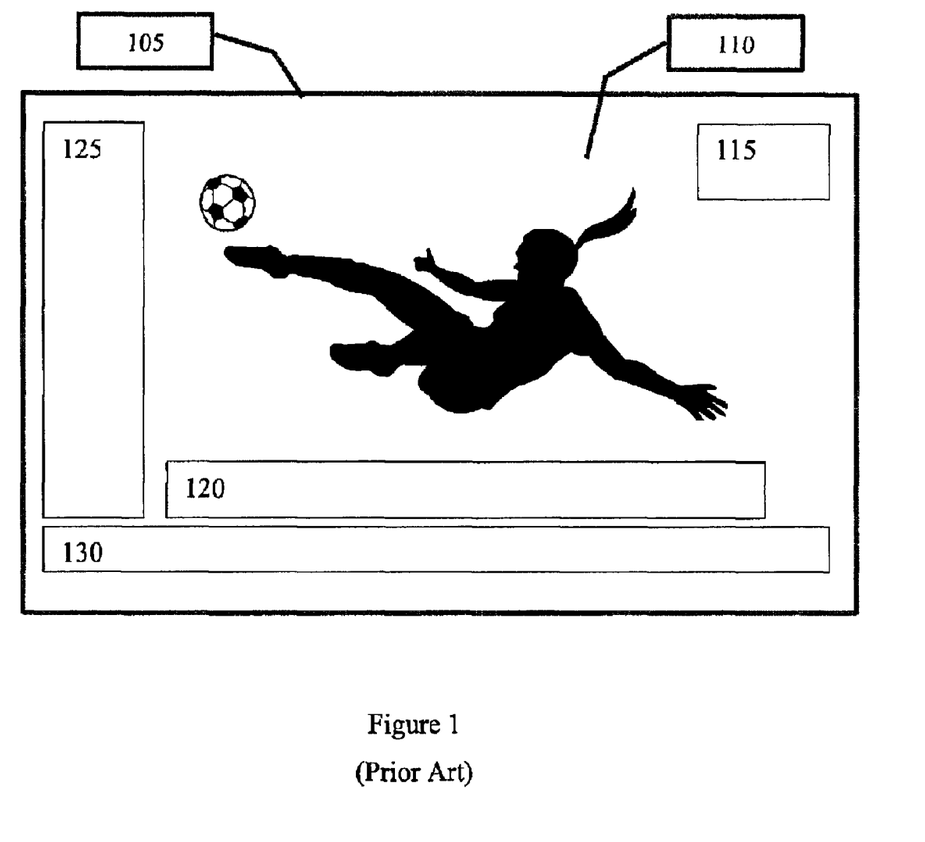
FIG. 1 shows a schematic view of a prior art broadcast video enhanced by overlay-graphics.

As large TV displays become mainstream outlets at end-consumer homes, television show producers will have more opportunities to augment live programming, since there is more room available on the displayed video image to insert overlay-graphics into. FIG. 1 shows exemplary representation of a broadcast program 105, including the cut-program 110 (typically live or play-back video of the covered event) and enhancements such as a sponsorship logo 115, a dash-board 120, a run-down 125, and a bottom-line 130. For example, the dash-board 120 overlay may contain real-time information including game-scores and shot-clock of a basketball game. These overlay-graphics are generated based on pre-determined overlay-templates that define the structure (e.g. size, shape, font-type), appearance (e.g. color and texture), animation rules (e.g. transition effects) of the overlay-graphics as well as their insertion time and location within the video frame.

A challenge in live program production is the need to enhance and re-cut the video feeds at multiple locations. Typically, the video is transmitted from the remote site (upstream) all the way to the end user's display (downstream) via multiple production centers, such as the on-site production-truck, the studio at the broadcast company site, and various local distribution sites. At each production site the video received may be further enhanced and may be combined with (cut into) other video feeds. Much of the processing that a video undergoes during production is a function of metadata associated with a certain event captured in the video. For example, metadata may be a location of a certain object at a certain time during the covered event or the instantaneous pose of the camera when capturing a certain video frame. Having these metadata in synchronization with their corresponding video frames is instrumental for triggering or generating enhancements that relate to real-time events or to inserting enhancements into the video in a way that is consistent with a camera's perspective, for example.

Known in the art methods for delivering video frames with synchronized metadata includes storing the metadata in areas of the video frame that are not part of the displayed video image (frame), such as in the header or within the ancillary data region of the video bitstream. The latter refers to an area in the video stream that is not part of the displayed video image, such as the Vertical Blanking Interval (VBI) that is traditionally used to store closed-caption data. Storing metadata in these regions, though, may not be a proper solution for applications that critically rely on it, as downstream manipulation of the video by a third party may override ancillary data. In fact, devices that compress or trans-code a video stream often strip out information external to the displayed image region as they reformat the video stream. Another option is to store the metadata in a separate data stream and transmit it in another channel (such as cellular communication link) in parallel to the video (that may be sent via satellite communication link). A drawback of this approach is the need for additional steps to manage book-keeping and synchronization.

An alternative solution to delivering video frames in synchronization with their corresponding metadata is employing digital watermarking methods. In recent years there has been an increasing interest in the field of digital watermarking. One enabler to this development is the ubiquitousness of digital content and the availability of tools and computer power for capturing, manipulating, transmitting, and viewing digital content. This trend has required methods of identifying and protecting the authorized source, distributer, or user of multimedia assets. Hence, digital watermarking is widely used for data protection and authentication, as well as other applications such as broadcast monitoring and covert communication.

Watermarking methods have also been proposed for the application of hiding information (metadata) within a host signal. A watermark, namely the hidden information, is inserted into the host signal so that the distortion induced is not perceptible. Watermarking video frames, then, may be a vehicle for delivering video frames with their corresponding metadata. Since the metadata is already embedded into the video frame it corresponds to, no additional steps of synchronization are required.

Figure 2:
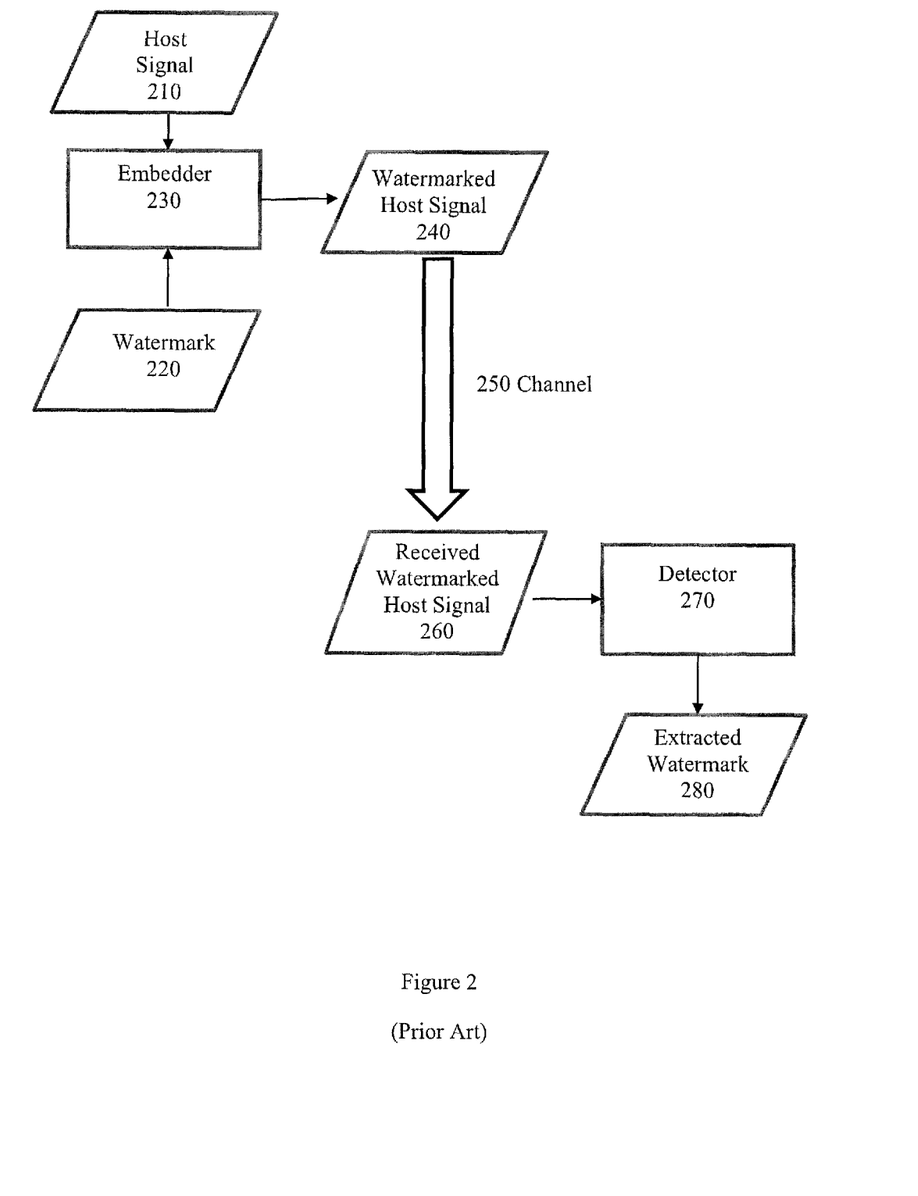
FIG. 2 shows a top-level diagram of a basic prior art watermarking system.

A top level description of a watermarking system is shown in FIG. 2. Therein, a digital signal 210, such as an audio, an image, or a video signal, may be used as a carrier (host) for a watermark (metadata) signal 220, imperceptibly embedded into it by a process employed by a watermark embedder 230. The watermarked host signal 240 is then delivered via a communication channel 250 to a watermark detector 270. Note that the received watermarked host signal 260 is a distorted version of the watermarked host signal 240, as the communication channel 250 may represent further processing of the watermarked signal (namely "attacks" such as compression or additive channel noise). The watermark detector 270 extracts the watermark from the received watermarked signal 260, outputting the extracted watermark signal 280. Ample watermarking techniques for embedding and extracting hidden information (watermarks) are known in the art. Various approaches are differentiated by characteristics such as imperceptibility (invisibility), robustness (invariability to attacks), and payload (capacity), as will be discussed further below.

In most applications imperceptibility of the watermark signal is an important requirement, especially when embedded into a broadcast video where degradation of quality is unacceptable. Yet, generally, there is a tradeoff between imperceptibility of a watermarking technique and its robustness and payload. A watermarking method is robust when the watermarked signal 240 can survive "attacks" introduced by further processing, either after embedding 230 (e.g. scaling, cropping, filtering, compressing), during transmission 250 (e.g. additive noise), or before detection 270 (e.g. decompressing, scaling, cropping, filtering). One way to increase robustness is to introduce redundancy, for example, by embedding each of the watermark's bits multiple times in various locations in the host signal. This approach limits the capacity (payload) of the watermarking method. Hence, payload is the number of bits a watermark encodes within a time unit. More specifically, when referring to a video, payload is the number of embedded bits per a frame. The larger the host signal, the higher its potential capacity. For instance, the payload of an HD video signal is expected to be higher than the payload of an SD video signal for the same level of robustness and imperceptibility.

A watermark may be embedded into the host signal in the spatial domain, the transform domain, or a combination thereof. First, the watermark (metadata) is converted into a bitstream. Then, insertion of the watermark bitstream may be done by substitution. For example, when using the host signal spatial domain, the least significant bit of a pixel value may be replaced by a watermark bit ("1" or "0"). To make sure that the watermarked host signal is perceptually identical to the original host signal, the components in the spatial domain that are modified by the watermark bitstream should be perceptually least significant. Another example is when using the transform domain, such as Discrete Fourier Transform (DFT), Discrete Cosine Transform (DCT), Discrete Wavelet Transform (DWT), Counterlet Transform (CT), or Singular Value Decomposition (SVD) to embed the watermark bitstream. Thus, one or more transform coefficients may be used to embed the watermark bits. In the transform domain most of the image energy is distributed across the low-medium frequency coefficients. Therefore, modifications made by substituting the watermark bits into these coefficients are distributed across the entire image and, therefore, changes to the watermarked image due to further processing (e.g. compression) will change the watermarked coefficient only slightly.

Additive watermarking is another approach for embedding watermark bitstream into the host signal. For example, when using the host signal spatial domain to embed a watermark bit into a pixel in an image, a certain value may be added if the bit is "1", otherwise, no addition is performed. The larger the added value is, the more robust is the watermarking method and the less imperceptible it is. To improve the imperceptibility, though, one may divide the added value among a group of pixels (e.g. an 8×8 block). In the transform domain, multiplicative watermarking may be used where the significant coefficients are multiplied by a certain value if an embedded watermark bit is "1". Notice that, in both approaches, the original image is needed at the detector to extract the watermark bitstream. Watermarking techniques that require the original host signal for detection are called "informed" (non-blind) methods.

Hence, watermarking techniques are classified into blind and non-blind techniques. A blind technique is one where the embedder or the detector does not make use of information related to the original host signal to embed or detect the watermark, respectively. On the other hand a non-blind, or informed, technique utilizes knowledge of the original host signal when embedding or detecting the watermark. Generally, informed detectors are more robust than blind detectors as the availability of the original host signal at the detector's input is instrumental in extracting the watermark, thereby improving the detector's performance significantly. In most applications though, the original host signal is not known at the detector side, in which case blind techniques are used. Embodiments of this invention propose embedding metadata into the broadcast video in conjunction with overlay-graphics. Also disclosed are embodiments that utilize overlay-templates to watermark metadata employing informed watermarking techniques.

BRIEF DESCRIPTION OF THE DRAWINGS

Embodiments of the invention are described with reference to the accompanying drawings.

DETAILED DESCRIPTION

Methods and systems for watermarking graphical overlays inserted into a broadcast video are provided. The watermark may contain metadata related to events captured in the broadcast video and otherwise by video cameras and other sensors. While the present invention is described herein with reference to illustrative embodiments for particular applications, it should be understood that the invention is not limited thereto. Those skilled in the art with access to the teachings provided herein will recognize additional modifications, applications, and embodiments within the scope thereof and additional fields in which the invention would be of significant utility.

Embodiments described herein utilize the graphical overlays inserted into a video broadcast to carry the video frames' metadata, wherein metadata contain information related to events from the covered scene. These metadata are embedded into the graphical overlay by means of watermarking, a technology that inherently provides synchronization between the video frames and the time dependent events' data.

The overlay-based watermarking systems and methods described in embodiments of the present invention are disclosed herein in the context of enhancing the production of a live sporting broadcast. A person skilled in the art will appreciate that the systems and methods of this invention may be applied to a wide range of applications including, but not limited to, any live or non-live production, as well as to any applications that require synchronization of metadata with video frames. The metadata herein may be embedded and extracted in real-time or may be embedded and archived to be extracted at a later time.

The design of graphical overlays is typically controlled and predetermined by the production team (e.g. broadcast company). This may include the overlays' appearance, structure, animation rules, insertion timing, and location within the video. These predefined design aspects are stored in a data structure referred to here as an overlay-template. For example, an overlay-template may define static and dynamic regions of the overlay. The overlay's static regions may include the overlay's background. The overlay's background is usually pre-designed and may be piecewise constant in time or animated according to a known set of rules. The overlay's dynamic regions, on the other hand, include content that is responsive to live events. Though these dynamic regions contain information that changes in response to live events, their content may be predictable. For example, when it is known that regions of overlay-graphic contain digits or text using a certain font type, optical character recognition (OCR) methods may be used for detection. Therefore, given a version of an overlay-graphic that is distorted by inclusion of a watermark or other attack, one may be able to restore the original version based on information given in its overlay-template.

According to embodiments herein, overlay-templates are utilized in conjunction with known in the art watermarking technologies to hide metadata (i.e. watermark bitstream) within the overlay's regions 115-130 in the broadcast video. Furthermore, it is proposed to take advantage of the control and freedom that a broadcast company has on the design of overlay-templates in its live programming to facilitate embodiments of this invention in a way that does not interfere with the overlay's primary function to deliver live game enhancements. Although the focus of this disclosure is watermarking of graphical overlays, it would be apparent to a person skilled in the art that watermarking of other video regions is also within the scope of embodiments of this invention.

Figure 3:
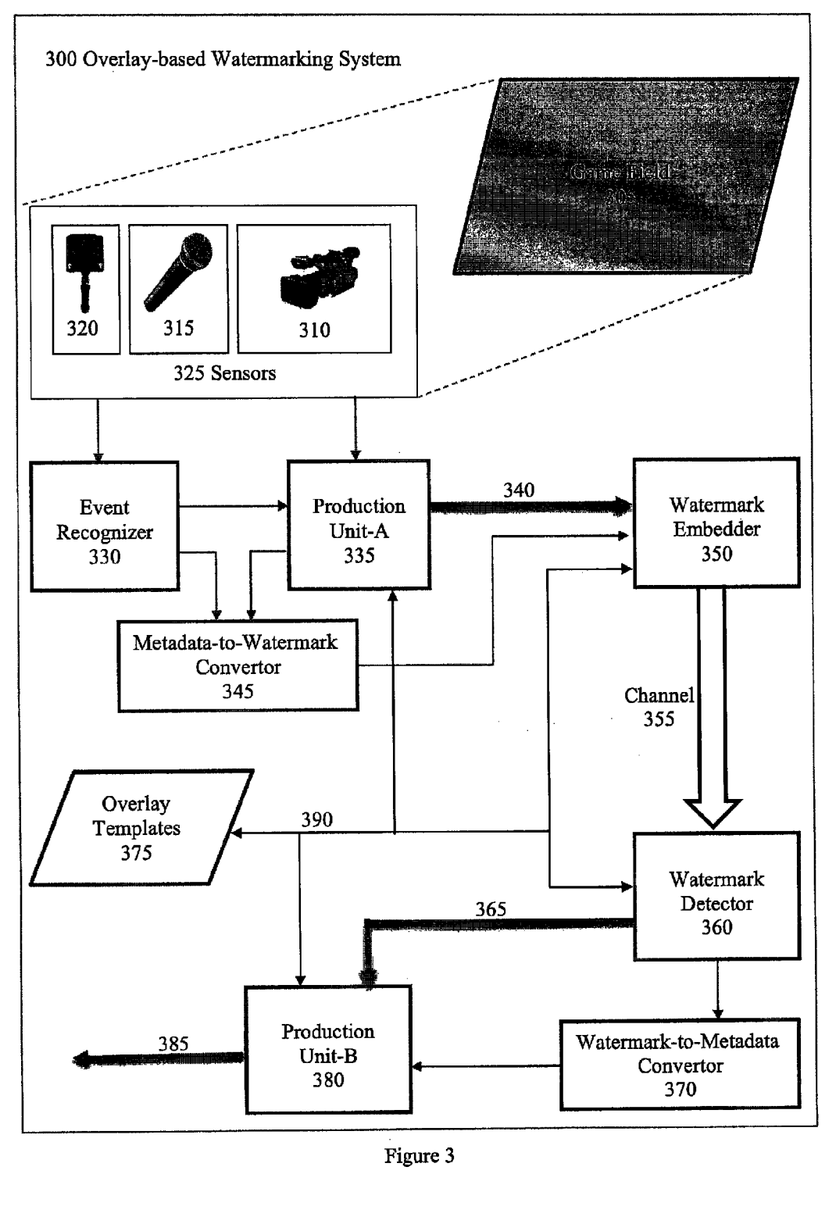
FIG. 3 shows a block diagram illustrating a system for overlay-based watermarking, according to one embodiment of the invention.

FIG. 3 schematically illustrates an overlay-based watermarking system 300 for video synchronization with contextual data (metadata). Therein, various sensors 325, such as video cameras 310, audio recorders 315, telemetry sensors 320, capture the action during a live sporting event. The system 300 further consists of a production unit-A 335 and a production unit-B 380, typically instrumented with switchers, recorders, renderers, and other computing components. The system 300 also includes an event recognizer 330, a metadata-to-watermark convertor 345, a watermark embedder 350, a watermark detector 360, and a watermark-to-metadata convertor 370. Additionally, overlay-templates 375 (stored in a database or any storing device) are included and may be local (internal) to some of the system components or otherwise accessible via a communication link (e.g. the internet or cellular links). Note that system components may be located at the same general location (e.g. at the game site or the same computing device) or may be distributed in multiple locations (e.g. multiple production centers, distribution stations, mobile devices, set-top-boxes, connected televisions, or in-region/head-end equipment). A communication channel 355 facilitates transmission of a watermarked cut-program to a receiving-end. The receiving-end being either the detector 360 for immediate (real-time) processing or a storage unit for archiving (to be retrieved and processed at a later time by the detector 360).

During a live event, such as a team-game, various sensors 325 continually collect data covering activity at or around the game field 305. Any means of data measurement may be used. For example, video cameras 310 may include cameras that are statically or dynamically (e.g. PTZ) positioned as well as the broadcast cameras. Audio signals may be recorded by an array of microphones 315 capable of sensing also a direction from which an audio signal is emitted. Telemetry data may be measured by a realtime localization system, utilizing signal propagation to localize tagged objects in the scene. It will be apparent to those of skill in the art that other means of data collection may be used (e.g. range, infrared, or acoustic cameras) as well as manual means of data recording performed by spectators, all represented by component 325.

The event recognizer 330 analyzes the raw data received from the various sensors 325. The event recognizer employs methods known in the art to detect and recognize events occurring during the game. For example, a shot in a basketball game, a goal in a soccer game, or a line change in a hockey game. Known in the art automatic object tracking methods may be used to detect and track the location and motion of objects such as the ball or the puck in addition to the positions and pose of the players. Machine learning algorithms may be utilized to identify players and their team identity. The event recognizer may also use techniques in computer vision that estimate a camera's parameters (a camera model) based on analyses of camera video images and knowledge of the scene model (e.g. field wire-frame). Events and other time-dependent information (i.e. metadata) are computed by the event recognizer and provided to production unit-A 335 to facilitate program enhancement.

Program production typically starts at the venue. Driven by a director, production unit-A 335 receives several video feeds from multiple cameras 310 and outputs one video feed—the cut-program 340. Production unit-A may also enhance the cut-program by inserting graphical overlays containing a representation of live events and other related information about the live action to improve viewer experience. Overlays are, then, generated and rendered into the cut-program using the pre-determined overlay-templates 375 in combination with the metadata received from the event recognizer 330. In exemplary embodiments, the metadata generated by the event recognizer may be augmented by metadata generated in the production unit-A itself, such as the ID of the camera used at a certain cut. All metadata are converted into a watermark bitstream by the metadata-to-watermark convertor 345. Next, the cut-program 340 and the watermark bitstream are inputted to the embedder 350 where a watermark bitstream (representative of the metadata) is inserted into its corresponding cut-program video frame.

Live programming production often continues in the studio. Especially high scale events require cutting other video feeds into the cut-program 340 generated at the venue. These other video feeds may be segments of in-studio experts' commentary or related archived video segments. Furthermore, and especially in sports production, game enhancement may be added to the cut program. For example, production unit-B 380 may include a video insertion system that renders into the cut-program video 365 "inlays" such as the First-Down-Line in a football game or virtual advertisements that are typically rendered onto physical surfaces at the scene (e.g. field/court floor). Many of these program enhancements require the use of metadata collected at the scene by system components 330 or 335. Since some of the enhancements may be triggered by live events or require instantaneous information about the sensors (e.g. camera models), these metadata need to be synchronized with the video frames they are associated with. Hence, embodiments of this invention disclose methods and systems that hide metadata into the cut-program video 340 by means of digital watermarking utilizing overlays' related information.

In general, a watermarking system, including an embedder 350 and a detector 360, is evaluated based on its resilience to channel "attacks". The channel 355 represents any local or remote communication link through which the watermarked video signal is transmitted to its destination. This may include satellite, cellular, cable, or fiber optic based communication as well as the internet or intranet networks. This channel 355 models any manipulation the watermarked cut-program (outputted by the embedder 350) may undergo, including scaling, cropping, filtering, and lossy compression as well as any additive channel noise.

When embedding a watermark bitstream into a frame image of a cut-program video, in some circumstances maintaining imperceptibility of the watermark is critical. On the other hand, the watermarking method employed should be robust and with high payload (capacity) to allow transmission of all metadata required for further processing. In general, a three-way trade-off exists among the imperceptibility, robustness, and payload properties of a watermarking system. For example, increasing robustness is often achieved by introducing a redundancy in the watermark representation (bitstream), which may lead to a reduction in payload. Another technique for improving robustness involves increasing the energy (magnitude) of the watermark signal; this may lead to an increase in the watermark's perceptibility. Utilizing overlays as carriers (host signals) for metadata, as proposed by embodiments herein, may be advantageous since overlays' structure and appearance are known and may be manipulated in a manner that leverages using watermarking frameworks for the application of frame-level synchronization of live video with corresponding metadata.

Central to methods and systems disclosed herein is the utilization of information about overlay-graphics that is stored in their overlay-templates and the controllability of their design. The overlay-templates' data 375 may be contained on the same computing device it is accessed by (e.g. productions unit-A 335) or on a separate computing or storage device connected to the accessing computing device. Either way, the overlay templates' data are available to the production units, 335 and 380, as well as to the watermark embedder 350 and detector 360, as shown in FIG. 3. For example, the overlay templates may be pre-loaded on the computer system containing the watermark detector 360 (e.g., from a hard drive or other storage device) or otherwise conveyed to the watermark detector 360 via any communication link 390, such as an internet connection. The overlay-template contains this information about the enhancement that is known and may be determined in advance, for example, structural information such as the dimension and shape of the graphic and its location within the video broadcast. Overlay-template may include also appearance information such as color, texture, animation pattern, etc. The overlays' dynamic information refers to those regions of the overlay that convey realtime information, such as game-score, game-time, and other game related measurements. Although this dynamic content is not known beforehand, it may be predictable. For example, based on an overlay-template it may be known that certain blocks contain numerical digits (0-9) and their font-type and color. Based on this knowledge and usage of known in the art pattern recognition methods, one may restore the original overlay-graphic out of the watermarked overlay version.

In an example embodiment, overlays inserted into the cut-program video in production unit-A 335 are used to carry the watermark bitstream. In this case, the embedder computing component 350 may use these rendered overlay-graphics and their overlay-templates 375 to employ known in the art embedding techniques. Moreover, knowledge of the overlay-templates 375 and the received watermarked overlay-graphics (residing within the received watermarked cut-program) at the detector 360 allows, first, the restoration of the un-watermarked (original) overlay-graphics rendered in 335 and, second, their usage in the detection process by employing known in the art informed (non-blind) detectors. As mentioned above, informed watermarking approaches are better positioned than blind watermarking ones to deliver robust high capacity watermarking techniques. Hence, restored original overlay-graphics may be used to extract watermarks from the received watermarked overlay-graphics, as well as to replace the received watermarked overlay-graphics in the video.

Hence, the received watermarked overlay-graphic is a distorted version of the original overlay-graphic due to the embedded watermark and the channel "attacks". Knowledge of the overlay-template allows for restoration of the original overlay-graphic. Such a process may begin with a layout analysis in which the static part and the dynamic part of the overlay-graphic are detected. The static part of the overlay-graphic may be restored to its original value based on information in the overlay-template. For example, a noisy background may be replaced with its original color value stored in the overlay-template. Restoring the content of a dynamic region may require segmentation of the characters (numbers, letters, etc.). Known in the art segmentation methods may be used to isolate each character. Next, a recognition step may be employed where a certain character is matched against all possible characters (as defined in the overlay-template). The matching operation may include a geometrical warping and a similarity metric to facilitate recognition. Once the certain character has been recognized (to be "A", for example) its original appearance may be restored using the pertaining information in the overlay-template. A person skilled in the art will appreciate that other methods of restoration may be used without departing from the spirit and scope of this invention's embodiments.

When dealing with methods that manipulate multimedia signals, two measures of perceptibility are often considered: fidelity and quality. The first measure is the similarity between the received watermarked signal 365 and the original signal 340. The second measure is the perceived quality of the received watermarked signal 365. In many applications, having a pleasing visual or auditory signal is more important than signal fidelity, since the viewer or listener is not exposed to the original signal and therefore comparison does not occur. However, perceived quality is not uniform and discerning changes depends, therefore, on a stimulus characteristic. For example, changes in a brighter region of an image are less noticeable by the human visual system (HVS) than the same changes in a darker region of the image. The HVS mechanism demonstrates also different sensitivity to stimuli depending on their spatial and spectral frequencies. For example, HVS shows higher sensitivity to luminance differences (patterns) at middle range frequencies than at high or low frequencies. In addition to varied sensitivity to pattern frequency, HVS responds differently to orientation, showing lower sensitivity to patterns with diagonal orientation (45 degree). Spectral sensitivity refers to HVS reduced sensitivity to the blue channel relative to the green or red channels.

Given the stimulus-dependent sensitivity of the HVS, a good strategy would be to insert watermarks in regions of the image where the viewers' visual system is least sensitive.

Thus, perceptual models in the art may be used to measure the perceptibility of a watermark as well as to control it. Watermarking technologies that use perceptual models to shape the added watermark bitstream are called perceptually adaptive methods. An opposite approach may be to design a host signal with regions that favor imperceptibility, meaning image regions with content for which the HVS is least sensitive. Naturally, a watermarking system cannot redesign the video content in this manner, but overlay-graphics may be a good candidate for this approach.

Embodiments of this invention, therefore, suggest controlling the perceptibility of a watermark by taking under consideration peculiarities of the human visual system. This may be done in general by designing overlays including one or more regions with HVS low perceptual sensitivity and focusing watermark insertion therein. For example, one may use the blue channel of an overlay-graphic to insert the watermark bitstream. Designing an overlay background with significant energy in the blue channel wherein information may be hidden by substitution, for instance, is one way to control perceptibility—a feature enabled by the idea of utilizing overlays as metadata carriers. Another approach may be to design an overlay background with large numbers of significant coefficients in the lower frequency range of a DCT. This will increase the payload and robustness of the watermarking methods. Yet, another approach is to design an overlay background with large number of significant coefficients in the diagonal (HH) detail components of the DWT, as the HVS sensitivity for changes is low therein.

Visible watermarking of overlay backgrounds may also be feasible in some embodiments. For example, one may partition the overlay background into sub-regions (e.g. blocks) each including a pattern with a specific gradient orientation. Thus, a block may encode binary information using distinguishable pattern orientations. (A pattern with four possible orientations may encode a two-bit word, for instance.) Similarly, a watermark bitstream may be encoded via motion orientation between successive blocks over time. In this case a block may encode binary information using distinguishable motion orientations. Though in this method the watermark is not hidden, it may not be perceptible as to the naïve viewer it may seem as part of the artistic design of the overlay background.

As mentioned before, in a high-scale production the enhancements of the broadcast program are often performed in multiple sites. However, in low-scale regional productions enhancements may be performed only at the studio, thereby reducing cost. Thus, in applications where some or all insertions of overlays are limited to the studio or to other sites located remotely to the event site, knowledge of image regions in the cut-program video that will be later covered by enhancements may be used by the watermark detector 350. For example, sometimes in a later phase of the production certain inlays or overlays are added to the final cut-program 385 by production unit-B 380. In this case, the watermark embedder 350 may embed a watermark bitstream into those regions known to be covered later on by graphics. In doing so, high robustness may be afforded at the expense of low imperceptibility as these regions will be covered with enhancement in production unit-B 380 after extracting the watermark by the watermark detector 360.

Figure 4:
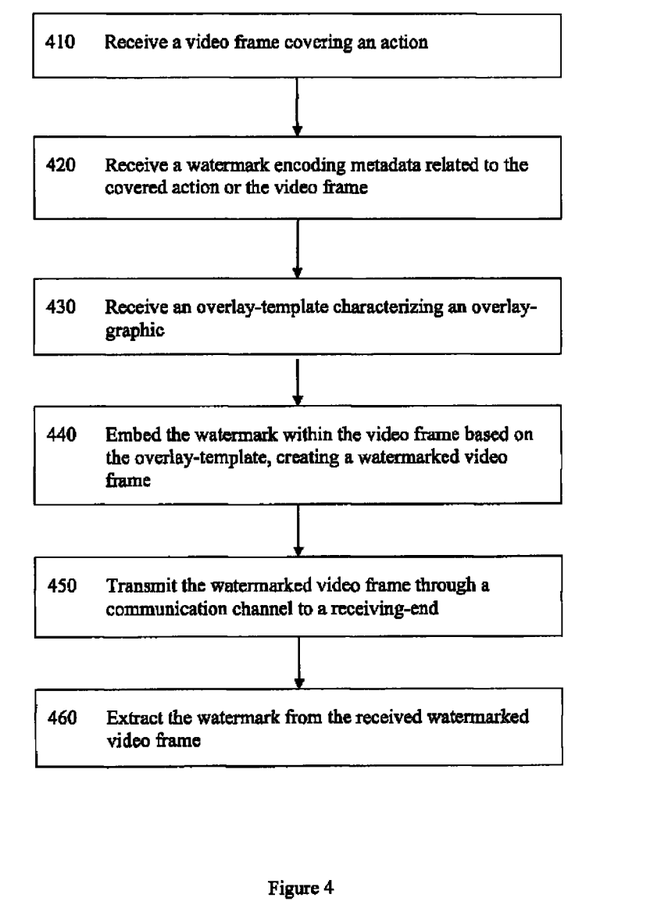
FIG. 4 shows a flowchart illustrating a method for overlay-based watermarking, according to one embodiment of the invention.

FIG. 4 shows a flowchart illustrating a method for delivering metadata with a video, wherein the video frames are synchronized with their associated metadata. In step 410 the method receives at its input the current video frame containing an image projection of the covered action. Events or other time-dependent data (i.e. metadata), corresponding to the received video frame are also received in step 420. These metadata are encoded into a bitstream, namely the watermark. In step 430 an overlay-template is received. This overlay-template may be the template of the overlay-graphic that is to be rendered into the received video frame at a certain phase of the production (for example, either at production unit-A 335 or production unit-B 380). Step 440 includes embedding the received watermark into the received video frame using information contained in the received overlay-template.

As described above, embodiments of this invention utilize the overlay-template to leverage known in the art techniques of digital watermarking, thereby enabling synchronized delivery of video and metadata. For example, where overlay-graphics are inserted into the video in the studio, the mere prior knowledge of the video region into which these overlay-graphics will be inserted may be used by the embedder 350 in step 440. The embedder in this case may be pre-configured to compromise the perceptibility of the inserted watermark in favor of robustness and payload if this region of the video is known to be covered downstream (380) after the watermark is extracted (360). Moreover, the overlay-graphic background (whose rendering may be prescribed by the overlay-template) may include regions for which HVS is least sensitive and therefore advantageous for hidden information insertion. Then again, the static part of an overlay (background) may be used to encode the watermark bitstream by rendering sub-regions with a certain gradient or motion orientation. Embedding techniques that rely on informed detection also may be used as the original overlay-graphic may be restored at the detector as explained above.

Following watermark insertion in step 440, the watermarked video is transmitted to a receiving-end via a communication channel in step 450. The communication channel 355 represents any manipulation that the watermarked video may undergo, for instance lossy compressing and channel additive noise. Therefore, the received watermarked video frame is practically a distorted version of the watermarked video frame generated by the embedder 350. The receiving-end may be a watermark detector 360 or a storing device. In the latter, the received watermarked video will be archived for future retrieval at which time frames may be fed to the watermark detector 360. In step 460, then, the watermark is extracted out of the received watermarked video frame, employing a detector 360. The detector may be a blind or an informed detector, where the latter is known in the art to be more robust. Using informed watermark detectors is enabled by embodiments of this invention as the original image of the overlay-graphics may be restored from the received watermarked video. As explained above, information in the overlay-template may be used to estimate the original image of the overlay-graphics using, for instance, OCR based techniques.

The present invention has been described in terms of several embodiments solely for the purpose of illustration. Persons skilled in the art will recognize from this description that the invention is not limited to the embodiments described, but may be practiced with modifications and alterations limited only by the spirit and scope of the appended claims.

What is claimed is:

1. A computer-implemented method, comprising:
   receiving at an embedder's input a video frame covering an action in an event;
   receiving at the embedder's input a watermark encoding metadata related to one of the covered action and the video frame;
   receiving at the embedder's input an overlay-template characterizing an overlay-graphic, wherein the overlay-graphic is a graphical enhancement inserted into the video frame, and wherein the overlay-template comprises information used to define and generate a design for the overlay-graphic insertion into the video frame; and embedding the watermark within the video frame based on the overlay-template to create a watermarked video frame, wherein embedding the watermark comprises embedding the watermark into the overlay-graphic using the overlay-template, creating a watermarked overlay-graphic.

2. The method of claim 1, further comprising:
transmitting the watermarked video frame through a communication channel to a receiving-end receiving a received watermarked video frame, wherein the receiving-end includes a detector.

3. The method of claim 2, further comprising:
extracting the watermark from the received watermarked video frame by the detector.

4. The method of claim 3, wherein
the overlay-graphic is rendered into the video frame based on the overlay-template and the metadata;
receiving the received watermarked video frame includes receiving a received watermarked overlay-graphic; and
extracting the watermark from the received watermarked video frame includes extracting the watermark from the received watermarked overlay-graphic.

5. The method of claim 4, further comprising:
restoring the overlay-graphic from the received watermarked overlay-graphic based on the overlay-template, creating a restored overlay-graphic.

6. The method of claim 5, wherein extracting the watermark from the received watermarked overlay-graphic includes using the restored overlay-graphic.

7. The method of claim 5, further comprising:
inserting the restored overlay-graphic into the video frame, replacing the received watermarked overlay-graphic.

8. The method of claim 1, wherein the overlay-template includes information related to at least one of structure, appearance, animation rules, insertion time, and location within the video frame.

9. The method of claim 1, wherein the overlay-graphic includes one or more regions with low perceptual sensitivity to the human visual system.

10. The method of claim 1, wherein the overlay-graphic includes one or more regions that encode the watermark based on an image sub-region gradient orientation or an image sub-region motion orientation.

11. A computer-implemented method for retrieving metadata watermarked into a video frame covering an action in an event, wherein watermarking is employed in conjunction with an overlay-graphic, wherein the overlay-graphic is a graphical enhancement inserted into the video frame, comprising:
receiving at a detector's input a received watermarked video frame;
receiving at the detector's input an overlay-template characterizing the overlay-graphic, and wherein the overlay-template comprises information used to define and generate a design for the overlay-graphic insertion into the video frame; and
extracting a watermark from the received watermarked video frame based on the overlay-template by the detector.

12. A system, comprising:
a video frame covering an action in an event;
an overlay-graphic, wherein the overlay-graphic is a graphical enhancement inserted into the video frame;
an overlay-template characterizing the overlay-graphic, wherein the overlay-template comprises information used to define and generate a design for the overlay-graphic insertion into the video frame;
a watermark encoding metadata related to one of the covered action and the video frame;
an embedder configured to embed the watermark into the video frame, based on the overlay-template, to create a watermarked video frame, wherein embedding the watermark comprises embedding the watermark into the overlay-graphic using the overlay-template, creating a watermarked overlay-graphic.

13. The system of claim 12, further comprising:
a communication link configured to transmit the watermarked video frame to a receiving-end including a detector.

14. The system of claim 13, wherein the detector configured to extract the watermark from the received watermarked video frame.

15. The system of claim 14, further comprising:
a first production unit configured to render the overlay-graphic into the video frame based on at least one of the overlay-template and the metadata; and wherein
the received watermarked video frame includes a received watermarked overlay-graphic.

16. The system of claim 15, wherein the detector is further configured to restore the overlay-graphic from the received watermarked overlay-graphic based on the overlay-template, creating a restored overlay-graphic.

17. The system of claim 16, wherein the detector is further configured to extract the watermark from the received watermarked overlay-graphic using the restored overlay-graphic.

18. The system of claim 16, wherein the detector is further configured to insert the restored overlay-graphic into the video frame, replacing the received watermarked overlay-graphic.

19. The system of claim 15, wherein the first production unit is configured to render the overlay-graphic with one or more regions with low perceptual sensitivity to the human visual system.

20. The system of claim 15, wherein the first production unit is configured to render the overlay-graphic with one or more regions that encode the metadata based on an image sub-region gradient orientation or an image sub-region motion orientation.

21. The system of claim 12, further comprising:
an event recognizer, configured to generate the metadata related to one of the covered action and the video frame.

22. The system of claim 12, further comprising:
a second production unit configured to render the overlay-graphic into the video frame based on at least one of the overlay-template and the metadata.

23. The system of claim 12, further comprising:
a metadata-to-watermark converter, configured to convert the metadata to a watermark bitstream.

24. The system of claim 12, further comprising:
a watermark-to-metadata converter, configured to convert the watermark bitstream to the metadata.

25. A system for retrieving metadata watermarked into a video frame covering an action in an event, wherein watermarking is employed in conjunction with an overlay-graphic, wherein the overlay-graphic is a graphical enhancement inserted into the video frame, comprising:
a received watermarked video frame;

an overlay-template characterizing the overlay-graphic, wherein the overlay-template comprises information used to define and generate a design for the overlay-graphic insertion into the video frame; and a detector configured to extract a watermark from the received watermarked video frame based on the overlay-template.

26. A non-transitory computer-readable storage medium storing a set of instructions that is executable by a processor, the set of instructions, when executed by the processor, causing the processor to perform operations comprising:

receiving at an embedder's input a video frame covering an action in an event;

receiving at the embedder's input a watermark encoding metadata related to one of the covered action and the video frame;

receiving at the embedder's input an overlay-template characterizing an overlay-graphic, wherein the overlay-graphic is a graphical enhancement inserted into the video frame, and wherein the overlay-template comprises information used to define and generate a design for the overlay-graphic insertion into the video frame;

embedding the watermark within the video frame based on the overlay-template, creating a watermarked video frame, wherein embedding the watermark comprises embedding the watermark into the overlay-graphic using the overlay-template, creating a watermarked overlay-graphic;

transmitting the watermarked video frame through a communication channel to a receiving-end receiving a received watermarked video frame, wherein the receiving-end includes a detector; and extracting the watermark from the received watermarked video frame by the detector.

* * * * *